United States Patent

[11] 3,588,740

| | | |
|---|---|---|
| [72] | Inventor | William E. Bell<br>Jerome, Ariz. |
| [21] | Appl. No. | 837,978 |
| [22] | Filed | Apr. 14, 1969 |
| [45] | Patented | June 28, 1971 |
| [73] | Assignee | The United States of America as represented by the Secretary of the Army |

[54] PULSED GAS ION LASER
2 Claims, 1 Drawing Fig.

[52] U.S. Cl. .................................................. 331/94.5
[51] Int. Cl. ................................................... H01s 3/09
[50] Field of Search ...................................... 331/94.5

[56] References Cited
UNITED STATES PATENTS
3,178,657  4/1965  Morso .......................... 331/94.5

OTHER REFERENCES

George, " Improved Population Inversion in Gaseous Lasers", Proc. IEEE. Vol. 51. August 1963. pp. 1152—3

Carlson et al. " On the Optimal Use of DC and RF Excitation In He-Ne Lasers", IEEE J. of Quantum Electronics, Vol. QB-4, March 1968, pp. 98— 9.

Schiel et al. " Direct Modulation of a He-Ne gas Laser" Proc. IEEE. Vol. 51. 06. June 1963. pp. 940—941.

*Primary Examiner*—Ronald L. Wibert
*Assistant Examiner*—R. J. Webster
*Attorneys*—Harry M. Saragovitz, Edward J. Kelly, Herbert Berl and Daniel D. Sharp ABSTRACT: An arrangement for pulsing a gas ion laser at relatively high pressure by superimposing upon a steady current sufficient to establish ion discharge in the positive resistance region but below the laser threshold, a high current pulse of variable pulse length.

Patented June 28, 1971
3,588,740
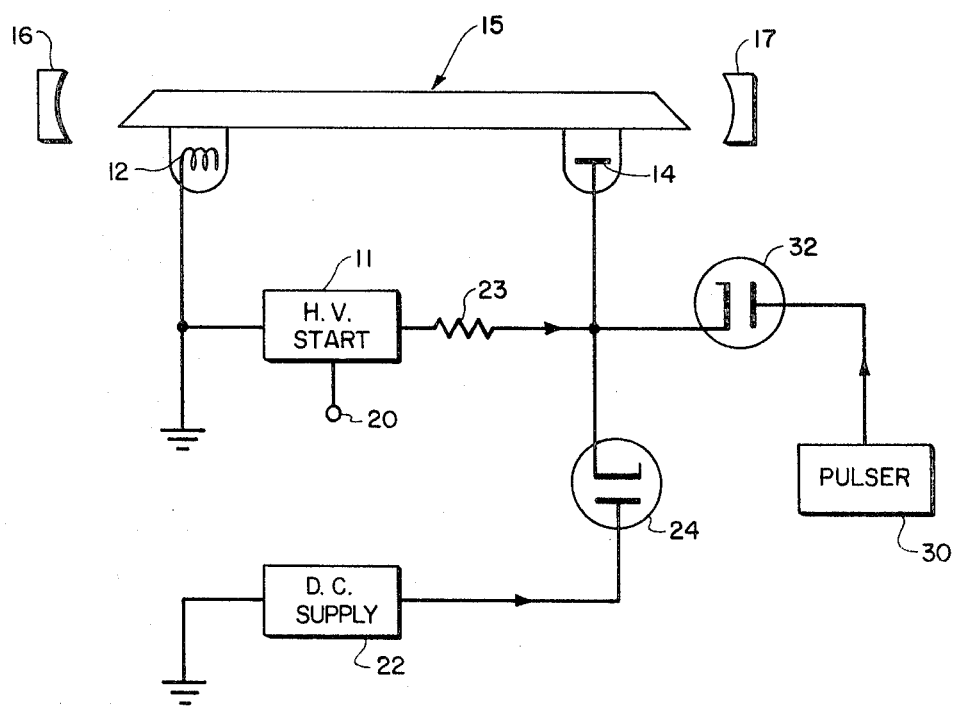
INVENTOR,
WILLIAM E. BELL
BY: *[signatures]*
Harry M. Saragovitz, Edward J. Kelly &
Herbert Berl
ATTORNEYS.

3,588,740

PULSED GAS ION LASER

BACKGROUND OF THE INVENTION

Previous schemes for obtaining pulsed operation from gas ion lasers have required very low pressures, on the order of a few microns. Such low pressures are disadvantageous in that they require extremely high striking voltages for the pulse and result in rapid cleanup of the active gas. At low pressures, the number of ions of gas is reduced and consequently, it is more difficult to maintain a gaseous discharge; consequently, a higher current is required. If RF energy is supplied continuously to the gas ion laser, the lifetime is but a few hours. By increasing the gas pressure within the laser, the lifetime can be increased considerably.

SUMMARY OF THE INVENTION

In accordance with the invention, pulse operation at much higher pressure levels can be achieved by superimposing pulses on a continuous direct current discharge which is below the laser threshold.

BRIEF DESCRIPTION OF THE DRAWING

FIG. 1 is a system diagram illustrating a pulse laser according to the invention.

DETAILED DESCRIPTION OF THE PREFERRED EMBODIMENT

A high voltage RF supply 11 is connected between the cathode 12 and anode 14 of the gas ion laser tube 15 which may be a water-cooled quartz tube containing a gas, such as argon or krypton, capable of ionic transitions. In one embodiment, pulsed argon operation was performed in a discharge tube 1.5 millimeters in diameter and 30 centimeters long. The reflectors 16 and 17 forming the laser optical resonator are shown schematically in FIG. 1 and may be external to the laser tube or may be placed within the tube envelope. Ionization of the gas molecules commences when the high voltage RF supply 11 is triggered by application at terminal 20 of a starting pulse from some pulse source which may have a high duty cycle. If the trigger pulses occur at a sufficiently high duty cycle, the gas does not become de-ionized between pulses. Once the gas in tube 15 has been preionized by the spark discharge resulting from the triggered RF voltage from supply 11, the direct current supply 22 supplies current by way of diode 24 to the laser tube 15. This steady direct current, passing through tube 15, effectively is a keep-alive current and is sufficient to establish the ion discharge in the positive resistance region but not normally sufficient to be above the threshold for laser action. A typical value of the steady DC current is about 2 amperes. The starting voltage supply 11 is isolated from the direct current supply 22 by means of resistor 23 and reverse diode 24.

The gas tube is brought above the laser current threshold by means of the current pulses 30 which supplies a current pulse of the order of 20 amps and 10 to 100 microseconds duration by way of diode 32 to the laser tube 15. The pulser 30 may be a self-pulsing circuit or a triggered pulse generator. The diode 32 isolates the pulsing circuit from the high voltage supply 11 and the direct current supply 22.

I claim:

1. An improved gas ion laser for use at relatively high pressures comprising a laser tube containing a gas capable of ionic transitions, said laser tube having cathode and anode electrodes and optical resonator reflecting elements, high voltage radio frequency energy supply means for preionizing said gas in the region between said electrodes, a direct current supply means coupled to said electrodes for establishing a continuous discharge current flow through said laser tube which is slightly below the laser current threshold, and pulse generating means coupled to one of said electrodes for passing current through said laser tube in excess of said laser current threshold.

2. An improved gas ion laser as set forth in claim 1 wherein said pulse generating means is isolated from said high voltage radio frequency energy supply means and from said direct current supply means.